(12) United States Patent
Tseng (10) Patent No.: US 12,366,718 B2
(45) Date of Patent: Jul. 22, 2025

(54) FILTER DRIVING DEVICE

(71) Applicant: ALPHA NETWORKS INC., Hsinchu (TW)

(72) Inventor: Hsin-Miao Tseng, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 695 days.

(21) Appl. No.: 17/691,313

(22) Filed: Mar. 10, 2022

(65) Prior Publication Data

US 2023/0025519 A1 Jan. 26, 2023

(30) Foreign Application Priority Data

Jul. 23, 2021 (TW) ................................. 110127123

(51) Int. Cl.
*G02B 7/00* (2021.01)
*G02B 26/00* (2006.01)
*G03B 11/00* (2021.01)

(52) U.S. Cl.
CPC ........... *G02B 7/006* (2013.01); *G02B 26/007* (2013.01); *G03B 11/00* (2013.01)

(58) Field of Classification Search
CPC . G02B 7/00; G02B 7/006; G02B 7/02; G02B 26/00; G02B 26/007; G02B 26/023; G02B 5/20; G02B 5/205; G02B 5/208; G02B 5/223; G03B 11/00; G03B 17/12; G03B 17/14; G03B 5/00; G03B 9/02; G03B 9/04; G03B 9/06; G03B 9/10; G03B 9/14; G03B 9/24
USPC ........ 359/892, 885, 888, 889, 350; 396/449, 396/463, 452, 493, 460, 505, 507, 169, 396/170

See application file for complete search history.

(56) References Cited

U.S. PATENT DOCUMENTS 5,070,407 A * 12/1991 Wheeler .............. G02B 26/007
359/889
2007/0264006 A1* 11/2007 Huang ..................... G03B 9/02
396/505

FOREIGN PATENT DOCUMENTS

KR 101795553 * 11/2017 ............. G03B 17/14

OTHER PUBLICATIONS

English translation of KR 101795553. (Year: 2017).*

* cited by examiner

*Primary Examiner* — Jie Lei
(74) *Attorney, Agent, or Firm* — Birch, Stewart, Kolasch & Birch, LLP (57) ABSTRACT

A filter driving device includes a seat, at least one driving module, at least one filter module, and at least one linking member. The seat has a front side and a rear side, which are opposite to each other, and a light-transmission hole passing through the front side and the rear side. The at least one driving module provided on the front side of the seat. The at least one filter module provided on the rear side of the seat. The at least one linking member which is provided on the seat and connected to the at least one driving module and the at least one filter module; the at least one driving module drives the at least one linking member to move the at least one filter module to switch different light filtering modes for light passing through the light-transmission hole.

10 Claims, 9 Drawing Sheets

FILTER DRIVING DEVICE

BACKGROUND OF THE INVENTION

1. Technical Field

The present invention relates generally to a filter driving device, and more particularly to a filter driving device which is conducive to miniaturization.

2. Description of Related Art

Conventionally, for making a camera suitable for different environments, different filters are generally used according to environmental factors to obtain better image quality. For example, during the daytime, IR (infrared) filters are suitable for photographic lens to block the infrared rays in the visible light from entering so as to prevent infrared rays from affecting normal image presentation. On the other hand, at night, AR (Anti-Reflection) filters are suitable for photographic lens to reduce the reflection of visible light and reduce glare so as to increase the brightness of the image.

The conventional filter driving device includes a driving device, a filter holder, an IR filter, an AR filter, and a seat. The driving device, the filter holder, the AR filter, and the IR filter are set on one side of the seat. The AR filter and the IR filter are adjacently installed on the filter holder. The seat has a light-transmission hole and a lateral guide. The filter holder is provided in the lateral guide, and can be driven by the driving device to perform lateral and linear reciprocating movement in the lateral guide. Through the design, move the AR filter or the IR filter to the position aligned with the light-transmission hole can switch the filter to make the AR filter or the IR filter to play the role.

However, because the driving device, the filter holder the AR filter, and the IR filter of the filter driving device are all set on the same plane on one side of the seat, and furthermore, a space must be reserved in the seat for the filter holder to move laterally, it is easy to cause the filter driving device to be too large, which limits the application of the camera. Therefore, the conventional filter driving device still needs improvement.

BRIEF SUMMARY OF THE INVENTION

In view of the above, the primary objective of the present invention is to provide a filter driving device whose volume can be effectively reduced, which facilitates the miniaturization of a photographic equipment.

The present invention provides a filter driving device including a seat, at least one driving module, at least one filter module, and at least one linking member. The seat has a front side and a rear side, which are opposite to each other, and a light-transmission hole passing through the front side and the rear side; the at least one driving module provided on the front side of the seat; the at least one filter module provided on the rear side of the seat; and the at least one linking member which is provided on the seat and connected to the at least one driving module and the at least one filter module; the at least one driving module drives the at least one linking member to move the at least one filter module to switch different light filtering modes for light passing through the light-transmission hole.

The effect of the present invention is that, the at least one driving module and the at least one filter module are respectively provided on the front side of the seat and the rear side of the seat, so that the volume of the filter driving device can be effectively reduce, which facilitates the miniaturization of a photographic equipment.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
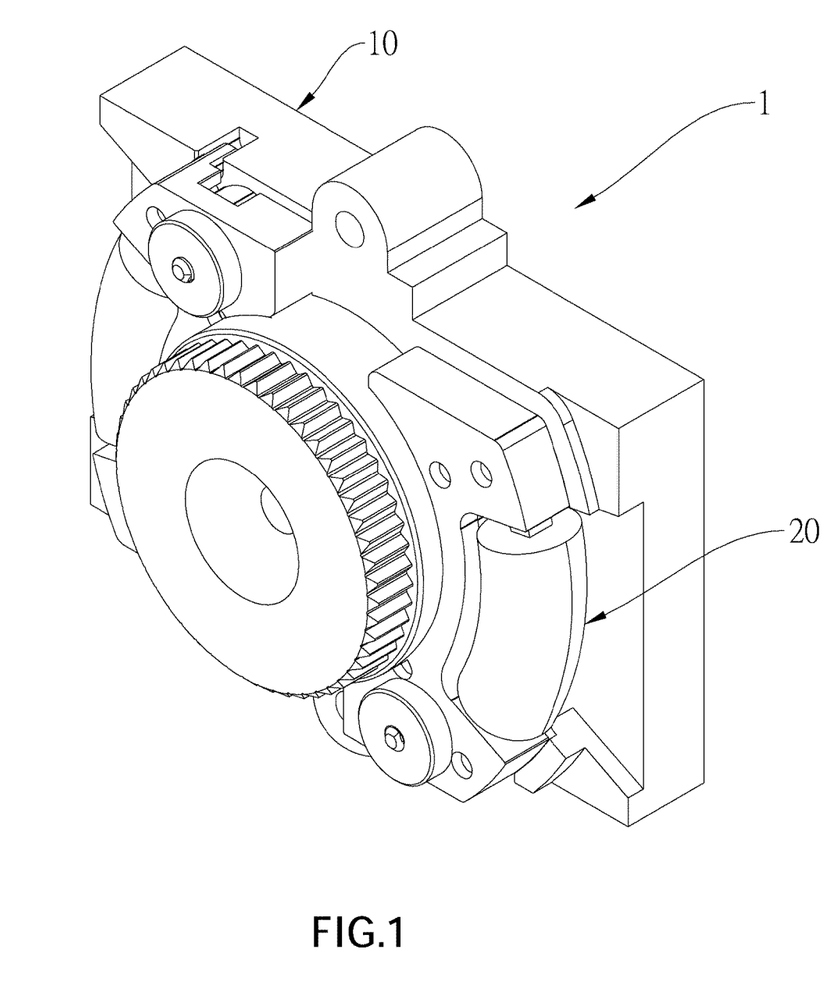
FIG. 1 is a perspective view of the filter driving device of the first embodiment of the present invention.
Figure 5:
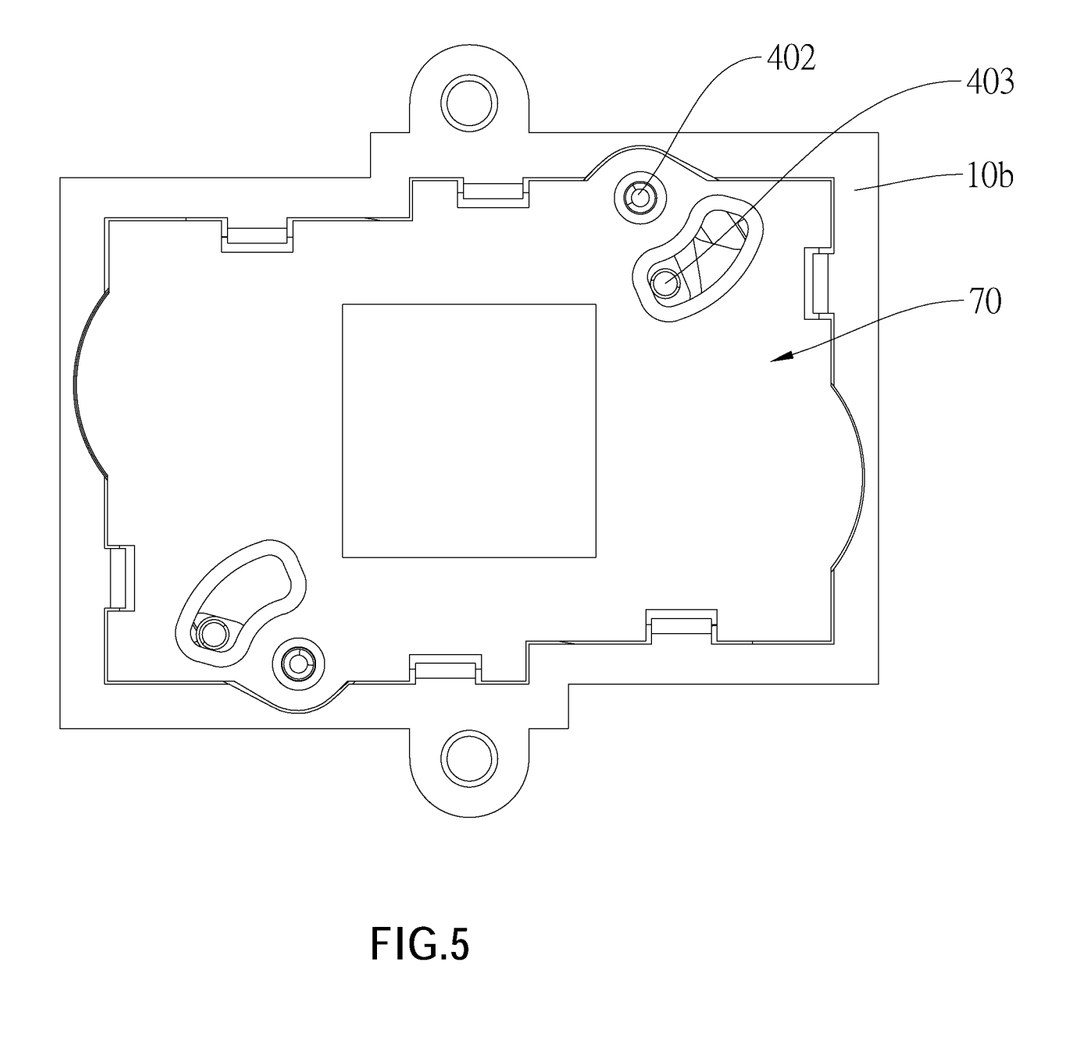
FIG. 5 is a rear view of the filter driving device in FIG. 1.

As shown in FIG. 1 and FIG. 5, a first embodiment of the present invention, a filter driving device 1, includes a seat 10, two driving modules 20, two filter modules 30, and two linking members 40. In this embodiment, the two driving modules 20 are defined as a first driving module 21 and a second driving module 22, the two filter modules 30 are defined as a first filter module 31 and a second filter module 32, and the two linking members 40 are defined as a first linking member 41 and a second linking member 42.

The seat 10 has a front side 10*a* and a rear side 10*b*, which are opposite to each other, and further has a light-transmission hole 101 which passes through the front side 10*a* and the rear side 10*b* of the seat 10. The first driving module 21 and the second driving module 22 are set on the front side 10*a* of the seat 10, and located on both sides of the light-transmission hole 101 respectively. The first filter module 31 and the second filter module 32 are set on the rear side 10*b* of the seat 10. The first linking member 41 and the second linking member 42 are set on the seat 10; the first linking member 41 connects the first driving module 21 and the first filter module 31 correspondingly, and the second linking member 42 connects the second driving module 22 and the second filter module 32 correspondingly. Additionally, the first driving module 21 drives the first linking member 41 to move the first filter module 31, and the second driving module 22 drives the second linking member 42 to move the second filter module 32; in this way, different light filtering modes can be switched for the light passing through the light-transmission hole 101. With the design that the two driving modules 20 and the two filter modules 30 are respectively arranged on the front side 10*a* of the seat 10 and the rear side 10*b* of the seat 10, the volume of the filter driving device can be effectively reduce, which facilitates the miniaturization of a photographic equipment. Moreover, the design that a single driving module dives a single filter module correspondingly during switching the light filtering modes, in other words, the two driving modules perform switching individually, obtains higher operational efficiency.

In this embodiment, the number of the driving modules, the filter modules, and the linking members are two as examples, while in other embodiments, the number of ones can be one or more than two. For example, one driving module can drive one linking member to move one filter module, wherein there can be two different filters in the filter module so as to switch different light filtering modes for the light passing through the light-transmission hole.

Figure 2:
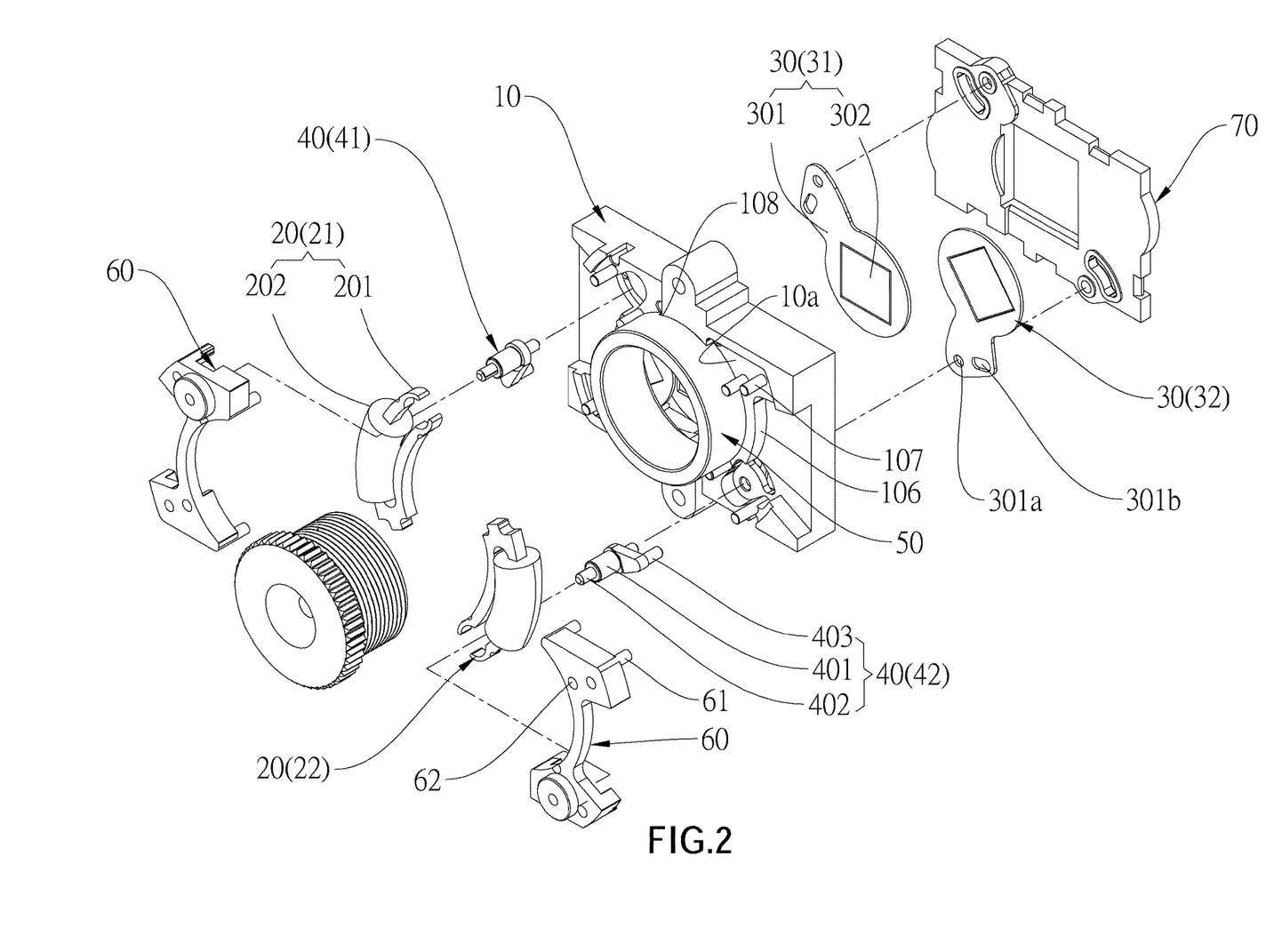
FIG. 2 is an exploded view of the filter driving device in FIG. 1.

As shown in FIG. 2, each of the two driving modules is a solenoid valve which includes a U-shaped magnet 201 and a coil 202 which is provided on the U-shaped magnet. Each of the two linking members 40 has a magnet 401, a rotating shaft 402, and a connecting rod 403. The rotating shaft 402 and the connecting rod 403 are connected to each other; the magnet 401 is provided on the rotating shaft 402, and each magnet 401 is provided between two ends of each U-shaped magnet 201, wherein each coil 202 can be connected to a power source through conducting wire. In this way, the polarity of both ends of each U-shaped magnet 201 can be changed by controlling the electrical signal inputting to each coil 202. According to the principle that like polarities repel each other and unlike polarities attract each other, both ends of the U-shaped magnet 201 generate repulsion or attraction to the polarity of the magnet 401, so that the rotating shaft 402 rotates around a pivot and drives the connecting rod 403 to swing.

Figure 6:
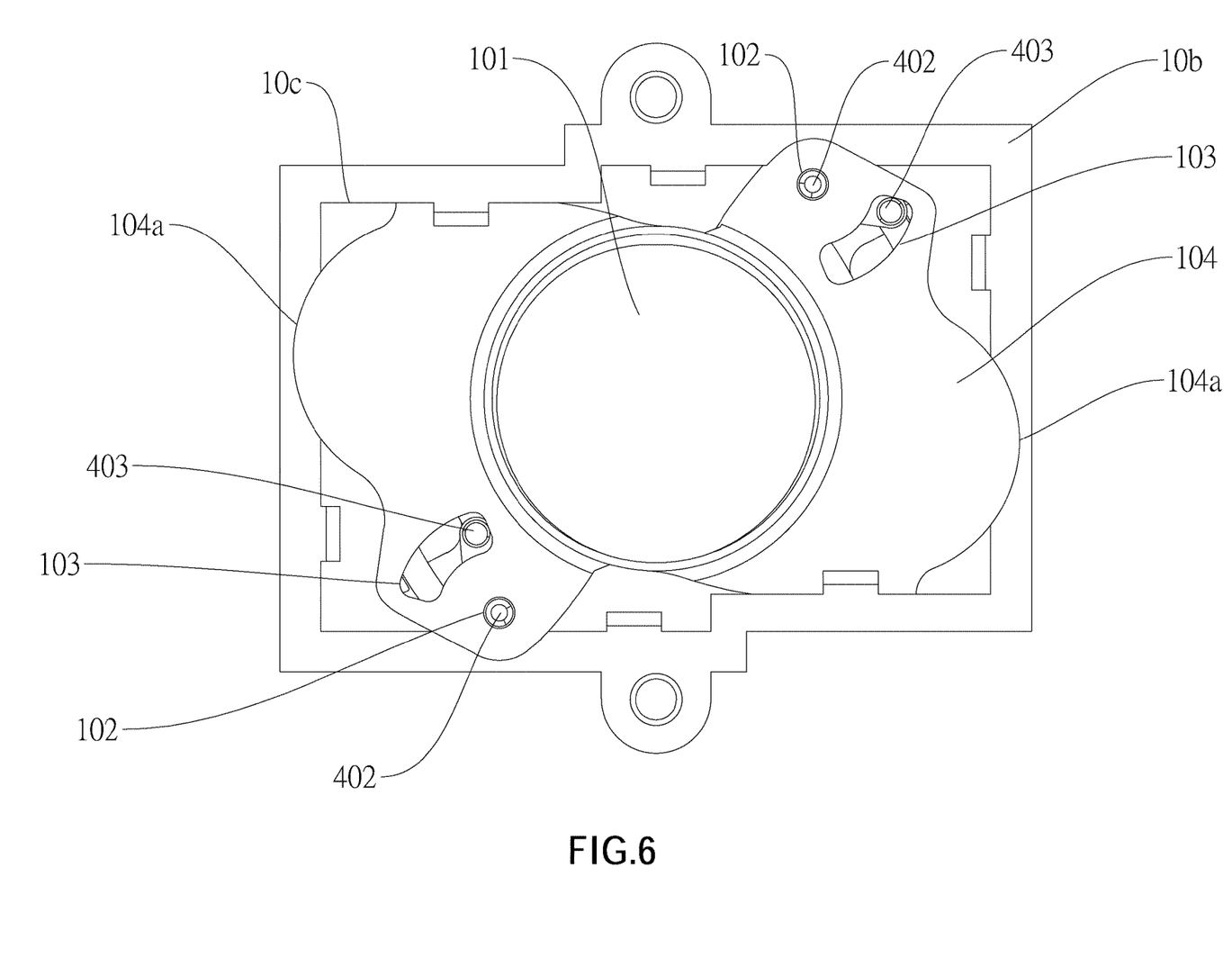
FIG. 6 is a rear view of the seat of the filter driving device in FIG. 1.
Figure 7:
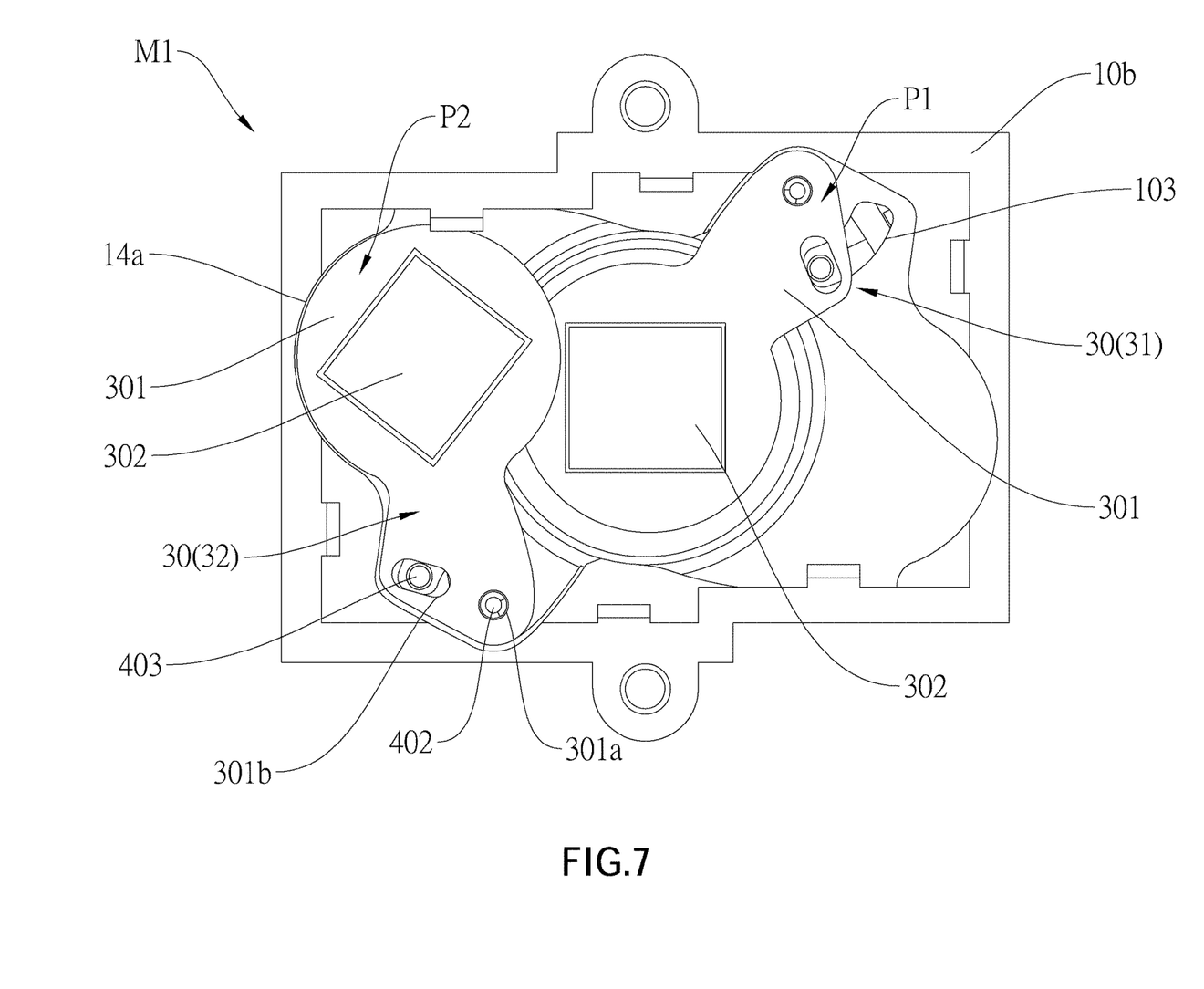
FIG. 7 is an operation diagram of the filter driving device in FIG. 1.

As depicted in FIG. 6, the seat 10 has two mounting holes 102 and two location restricted holes 103; the two mounting holes 102 and the two location restricted holes 103 are formed around the light-transmission hole 101 and pass through the seat 10. The rotating shaft 402 of each linking member 40 passes through the corresponding mounting hole 102, and the connecting rod 403 of each linking member 40 passes through the corresponding location restricted hole 103. In this way, when each driving module 20 drives the rotating shaft 402 of each linking member 40 rotate in the mounting holes 102, the connecting rod 403 of each linking member 40 is restricted by both ends of the location restricted hole 103, and is movable between the both ends of the location restricted hole 103. As illustrated in FIG. 7, each filter module 30 includes a filter holder 301 and a filter 302. The filter holder 301 has a shaft hole 301a and an elongated hole 301b. The rotating shaft 402 passes through the mounting hole 102 of the seat 10, and then passes through the shaft hole 301a of the filter holder 301; the connecting rod 403 passes through the location restricted hole 103 of the seat 10, and then passes through the elongated hole 301b of the filter holder 301. In this way, when each driving module 20 drives the rotating shaft 402 of each linking member 40 rotate in the mounting hole 102, the filter module 30 can be driven to rotate around the center of the rotating shaft 402. Moreover, because the connecting rod 403 of each linking member 40 is restricted by the both sides of the location restricted hole 103, each filter module 30 is movable between a working position P1 and an idle position P2.

As shown in FIG. 6 and FIG. 7, the seat 10 has an accommodating recess 104 on the rear side 10b thereof. The location restricted hole 103 and the mounting hole 102 are formed at the bottom of the accommodating recess 104. Each filter module 30 can swing within the accommodating recess 104. Each of the recess walls on opposite sides of the accommodating recess 104 has a limiting portion 104a, and each filter module 30 can abut against the limiting portion 104a. In this embodiment, the outline of the limiting portion 104a matches the outline of the filter holder 301 of the filter module 30, which avoids displacement of the filter holder 301 relative to the seat 10, and thus makes the filter holder 301 stay at the proper location. In addition, because the two driving modules 20 are set on the front side 10a of the seat 10, the thickness of the two driving modules don't need to be taken into consideration when designing the depth of the accommodating recess 104, but the thickness of the two filter modules need to be taken into consideration. Therefore, the overall volume of the filter driving device 1 can be effectively reduced.

Figure 8:
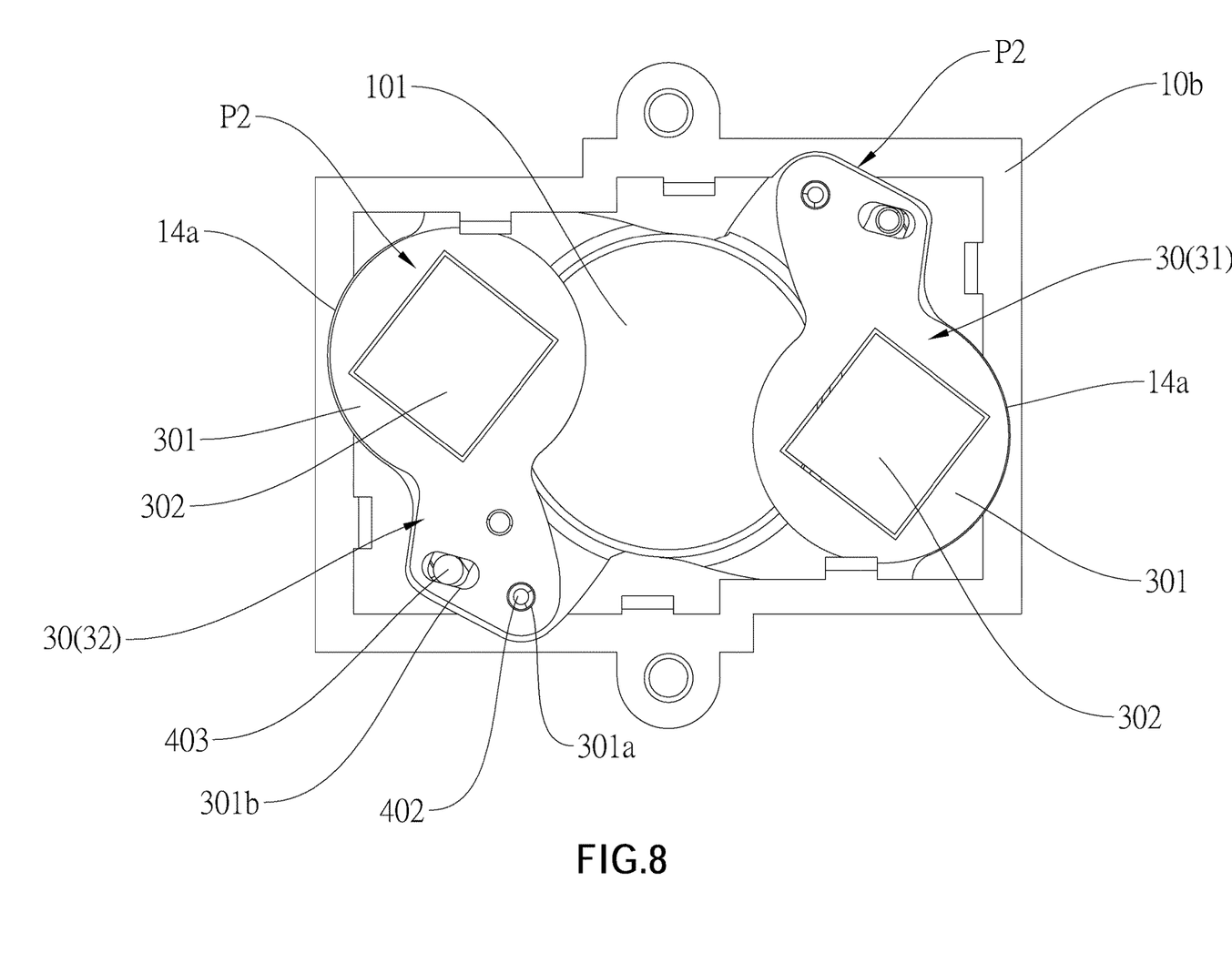
FIG. 8 is an operation diagram of the filter driving device in FIG. 1.
Figure 9:
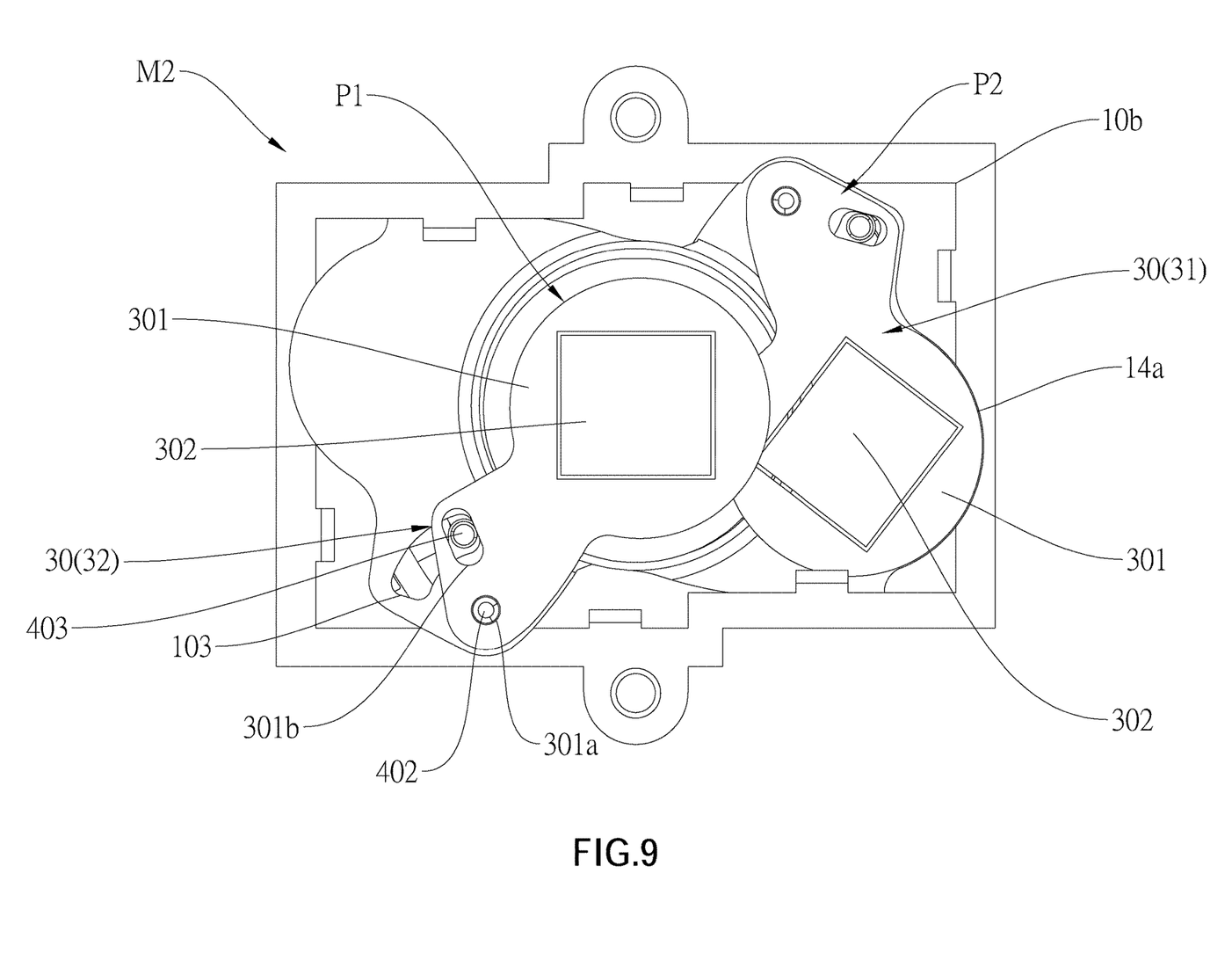
FIG. 9 is an operation diagram of the filter driving device in FIG. 1.

As depicted in FIG. 7 to FIG. 9, in this embodiment, the light filtering modes for the light passing through the light-transmission hole 101 are switched through the first driving module 21 which drives the first linking member 41 to move the first filter module 31 as well as the second driving module 22 which drives the second linking member 42 to move the second filter module 32. In this embodiment, the light filtering modes include a daytime mode M1 and a night mode M2.

As shown in FIG. 7, the filter driving device 1 is switched to the state of daytime mode M1. In the daytime mode M1, the filter of the first filter module 31 faces towards the light-transmission hole 101 through the first driving module 21 which drives the first linking member 41 to move the first filter module 31 to the working position P1, wherein the filter 302 of the first filter module 31 can be an IR (infrared) filter so as to block the infrared rays in the visible light from entering, as well as through the second driving module 22 which drives the second linking member 42 to move the second filter module 32 to the idle position P2 so that the filter holder 301 of the second filter module 32 abuts against the limiting portion 104a of the accommodating recess 104, and furthermore, the filter 302 of the second filter module 32 moves away from the light-transmission hole 101, wherein the filter 302 of the second filter module 32 can be an AR (Anti-Reflection) filter so as to reduce the reflection of visible light, reduce glare, and thus to increase the brightness of the image. Practically, the filters of the first filter module 31 and the second filter module 32 are not limited to IR (infrared) filter and AR (Anti-Reflection) filter, and can be other types of filter.

As illustrated in FIG. 8 and FIG. 9, when the filter driving device 1 is switched from the daytime mode M1 to the night mode M2, as shown in FIG. 8, the first filter module 31 moves to the idle position P2 which abuts against the limiting portion 104a of the accommodating recess 104 by controlling the electrical signal inputting to the first driving module 21; furthermore, as shown in FIG. 9, the second filter module 32 moves to the working position P1 by controlling the electrical signal inputting to the second driving module 22 so that the filter 302 of the second filter module 32 faces towards the light-transmission hole 101. In this way, different light filtering modes for the light passing through the light-transmission hole 101 can be switched. In practice, the first driving module 21 and the second driving module 22 can controllably operate at the same time to reduce the operating time of switching light filtering modes. Moreover, inputting the electrical signals of the first driving module 21 and the second driving module 22 can respectively drive the first filter module 31 and the second filter module 32 to operate; when stopping inputting the electrical signals, the first filter module 31 and the second filter module 32 will remain in the positions after operation, which doesn't need additional electric current.

Additionally, in this embodiment, the filter driving device 1 includes a lens holder 50 for accommodating a lens. The lens holder 50 is provided on the front side 10*a* of the seat 10 and is integrally formed with the seat 10, and thus the number of components of the filter driving device 1 and the assembly complexity of the filter driving device 1 can be effectively simplified. Furthermore, in this embodiment, each driving module 20 is arc-shaped and matches the outline of the lens holder 50. Therefore, the overall volume of the filter driving device 1 can be further reduced for the miniaturization purpose.

In this embodiment, the components are installed and positioned through the matching of sizes and shapes. For example, as shown in FIG. 1 and FIG. 2, the seat 10 has two arc-shaped protrusions 106 on the front side, which are set around the outer periphery of the light-transmission hole 101. During installation, each driving module 20 can be positioned rapidly by engaging with the arc-shaped protrusion 106.

In addition, the filter driving device 1 includes two front lateral covers 60 and a rear cover 70. The two front lateral covers 60 are detachably connected to the front side 10*a* of the seat 10 respectively. Each driving module 20 is sandwiched between one of the front lateral covers 60 and the seat 10; each of the two front lateral covers 60 has a combining portion, and each of the both sides of the light-transmission hole 101 on the front side 10*a* of the seat 10 has a positioning portion. Moreover, the combining portion of each front lateral cover 60 has a plurality of lateral cover positioning columns 61 and a plurality of lateral cover positioning holes 62; the positioning portion of the seat 10 has a plurality of front side positioning columns 107 and a plurality of front side positioning holes 108, which match the lateral cover positioning columns 61 and the lateral cover positioning holes 62. Through matching the lateral cover positioning columns 61 with the lateral cover positioning holes 62 and matching the front side positioning columns 107 with the front side positioning holes 108, each driving module 20 and each linking member 40 can be stably sandwiched between the front lateral cover 60 and the seat 10.

Figure 3:
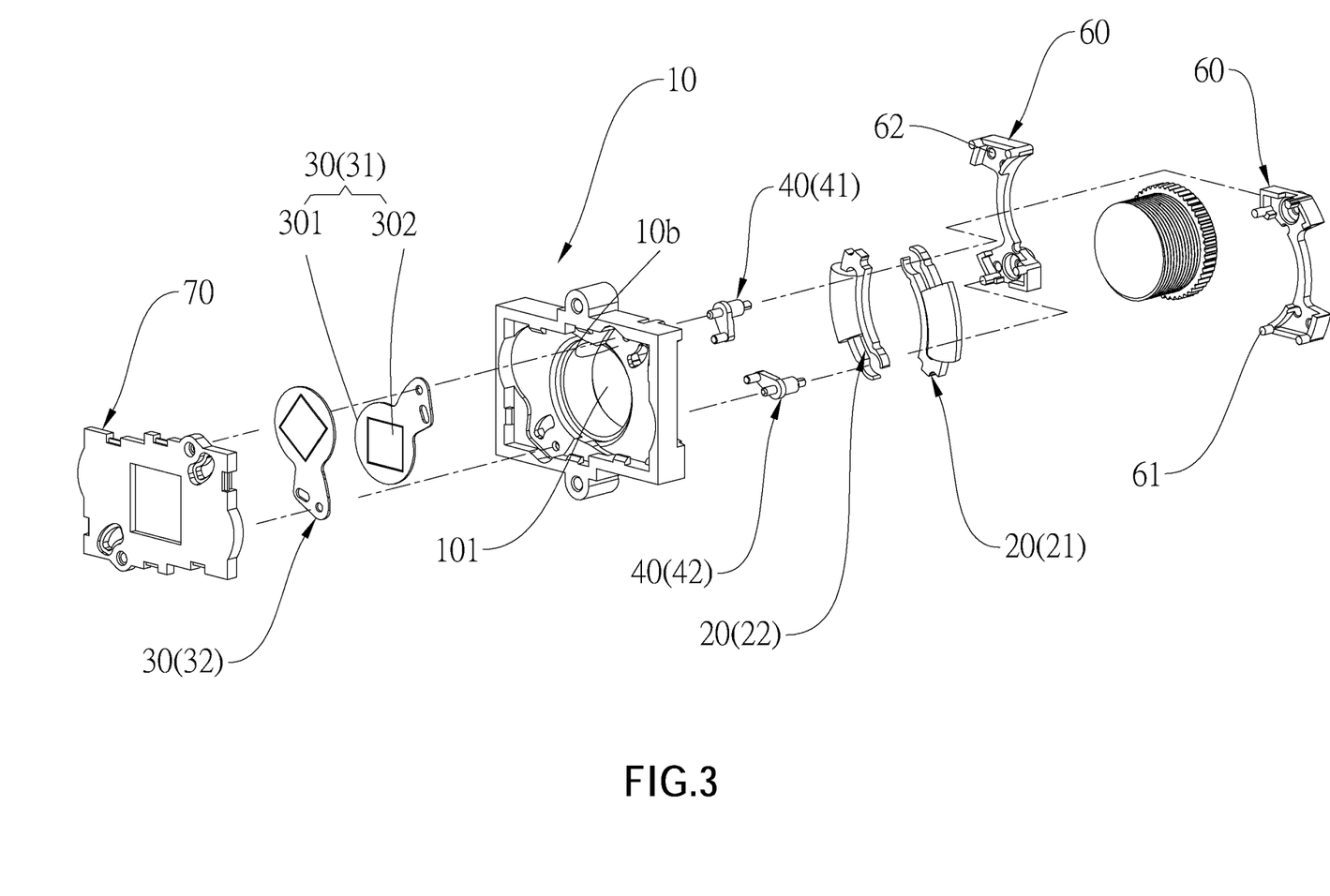
FIG. 3 is an exploded view of the filter driving device in FIG. 1.
Figure 4:
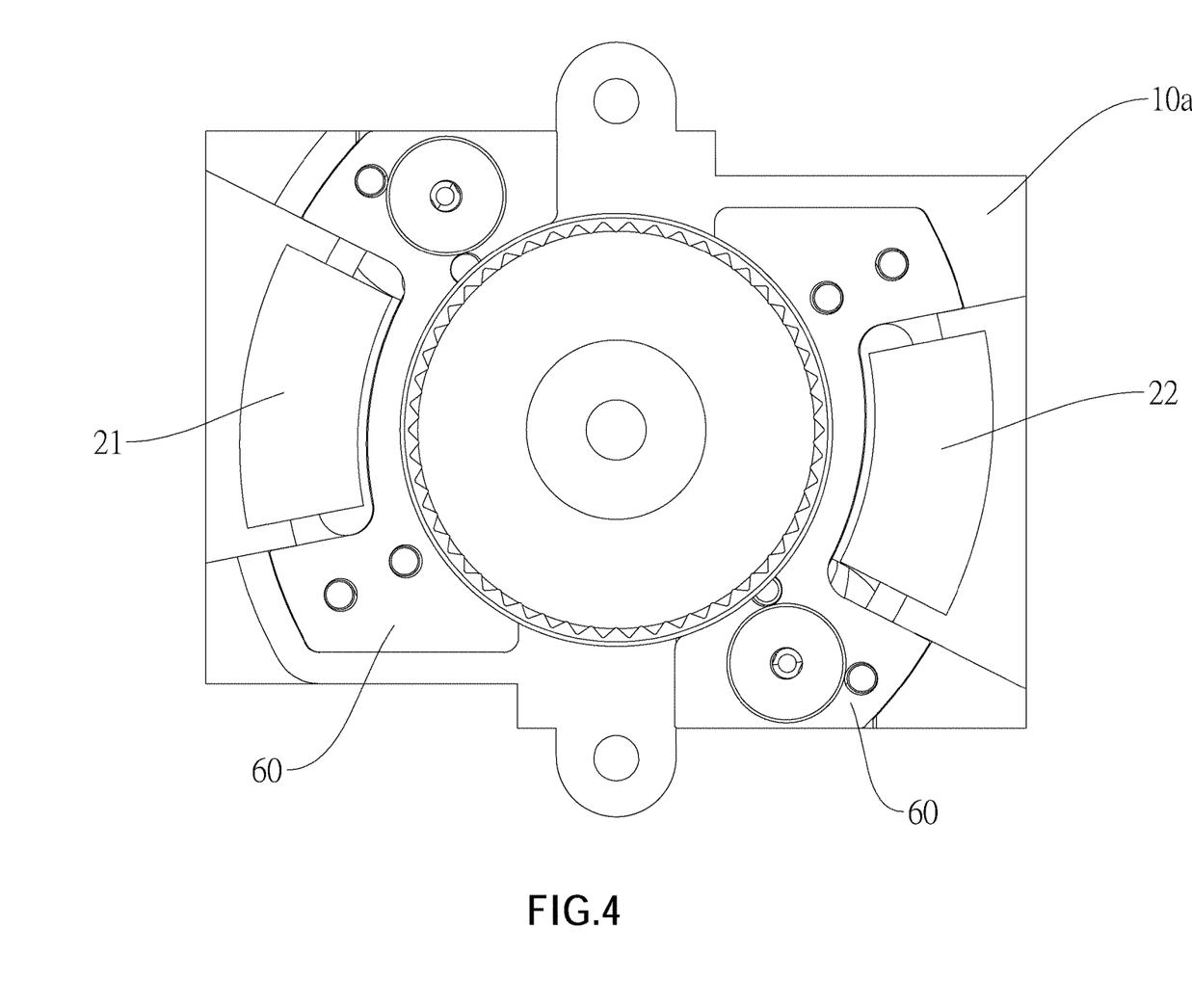
FIG. 4 is a front view of the filter driving device in FIG. 1.

As illustrated in FIG. 3, the seat 10 has a rear side opening 10*c* on the rear side 10*b*. The rear cover 70 is detachably connected to the rear side 10*b* of the seat 10, and covers the rear side opening 10*c*. The rear cover 70 has a plurality of protrusions and recesses on the periphery thereof, whose outlines match the shape of the rear side opening 10*c*; through positioning said protrusions and recesses to the rear side opening 10*c*, the rear cover 70 can be quickly installed on the rear side of the seat 10. In other words, the installation and positioning of the components of the present invention through the matching of sizes and shapes need no additional installation tools or glue so that the installation time can be significantly reduce, and the assembly process can be also simplified.

In overall, the design of the filter driving device 1 that provides each driving module 20, each linking member 40, and each filter module 30 to the front side 10*a* of the seat 10 and the rear side 10*b* of the seat 10 respectively can effectively reduce the volume of the filter driving device 1, which facilitates the miniaturization of a photographic equipment. Furthermore, the design that a single driving module 20 dives a single linking member 40 to move a single filter module 30 for performing switching individually can obtains higher operational efficiency. In addition, the installation and positioning of the components of the present invention through the matching of sizes and shapes can significantly reduce the installation time, and also simplify the assembly process.

It must be noted that the embodiments described above are only preferred embodiments of the present invention. All equivalent structures which employ the concepts disclosed in this specification and the appended claims should fall within the scope of the present invention.

What is claimed is:

1. A filter driving device, comprising:
    a seat having a front side and a rear side, which are opposite to each other, and a light-transmission hole passing through the front side and the rear side;
    at least one driving module provided on the front side of the seat;
    at least one filter module provided on the rear side of the seat; and
    at least one linking member which is provided on the seat and connected to the at least one driving module and the at least one filter module; the at least one driving module drives the at least one linking member to move the at least one filter module to switch different light filtering modes for light passing through the light-transmission hole;
    wherein the seat has two arc-shaped protrusions on the front side, which are set around the outer periphery of the light-transmission hole, each driving module can be positioned rapidly by engaging with each arc-shaped protrusion;
    wherein the seat has an accommodating recess on the rear side thereof, each filter module can swing within the accommodating recess.

2. The filter driving device of claim 1, wherein the number of the at least one driving module is two, and the number of the at least one filter module is two, and the number of the at least one linking member is two; each of the driving modules is set on one of two sides of the light-transmission hole respectively, and each of the linking members is drivable by each of the driving modules to move each of the filter modules.

3. The filter driving device of claim 2, wherein the seat has two mounting holes which are formed on periphery of the light-transmission hole and pass through the seat; each of the linking members passes through the corresponding mounting hole individually; each of the driving modules is controllable to drive each of the linking members to rotate around a center of a pivot.

4. The filter driving device of claim 3, wherein each of the linking members comprises a rotating shaft and a connecting rod which are connected; the seat has two location restricted holes which are formed on the periphery of the light-transmission hole and pass through the seat; each of the filter modules comprises a filter holder which has a shaft hole and an elongated hole thereon; the rotating shaft has the pivot, and is located within the mounting hole and the shaft hole; the connecting rod is located within the location restricted hole and the elongated hole, and is movable between two ends of the location restricted hole.

5. The filter driving device of claim 4, wherein the accommodating recess has the location restricted hole and the mounting hole at the bottom of the accommodating recess; each of the filter modules is able to swing and accommodated in the accommodating recess; each of two recess walls on opposite sides of the accommodating recess has a limiting portion; each of the filter modules can abut against the limiting portion.

6. The filter driving device of claim 2, further comprising two front lateral covers which are detachably connected to the front side of the seat respectively; each of the driving modules is sandwiched between one of the two front lateral covers and the seat.

7. The filter driving device of claim 6, wherein each of the two front lateral covers has a combining portion; each of both sides of the light-transmission hole on the front side of the seat has a positioning portion; the combining portion of each of the front lateral covers is connected to the positioning portion.

8. The filter driving device of claim 1, further comprising a lens holder which is located on the front side of the seat and is integrally formed with the seat.

9. The filter driving device of claim 8, wherein the at least one driving module is arc-shaped and matches an outline of the lens holder.

10. The filter driving device of claim 1, further comprising a rear cover; the seat has a rear side opening on the rear side thereof; the rear cover is detachably connected to the rear side of the seat, and covers the rear side opening.

\* \* \* \* \*